United States Patent
Bai et al.

(10) Patent No.: US 8,392,436 B2
(45) Date of Patent: Mar. 5, 2013

(54) SEMANTIC SEARCH VIA ROLE LABELING

(75) Inventors: Bing Bai, Plainsboro, NJ (US); Jason Weston, New York, NY (US); Ronan Collobert, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 328 days.

(21) Appl. No.: 12/364,041

(22) Filed: Feb. 2, 2009

(65) Prior Publication Data
US 2009/0204605 A1    Aug. 13, 2009

Related U.S. Application Data

(60) Provisional application No. 61/026,844, filed on Feb. 7, 2008.

(51) Int. Cl.
G06F 7/00 (2006.01)
G06F 17/00 (2006.01)

(52) U.S. Cl. .......................................... 707/758; 704/9

(58) Field of Classification Search .................. 707/759, 707/758, 736, 999.003; 704/1–10
See application file for complete search history.

(56) References Cited

U.S. PATENT DOCUMENTS

| | | | |
|---|---|---|---|
| 6,189,002 B1 * | 2/2001 | Roitblat | 1/1 |
| 6,240,409 B1 * | 5/2001 | Aiken | 1/1 |
| 6,246,977 B1 * | 6/2001 | Messerly et al. | 704/9 |
| 6,269,368 B1 * | 7/2001 | Diamond | 1/1 |
| 6,480,843 B2 * | 11/2002 | Li | 1/1 |
| 6,999,959 B1 * | 2/2006 | Lawrence et al. | 1/1 |
| 7,283,992 B2 * | 10/2007 | Liu et al. | 1/1 |
| 7,890,539 B2 * | 2/2011 | Boschee et al. | 707/794 |
| 2004/0215663 A1 * | 10/2004 | Liu et al. | 707/104.1 |
| 2005/0080776 A1 * | 4/2005 | Colledge et al. | 707/3 |
| 2007/0112764 A1 * | 5/2007 | Yih et al. | 707/5 |
| 2007/0156669 A1 * | 7/2007 | Marchisio et al. | 707/4 |
| 2008/0221878 A1 * | 9/2008 | Collobert et al. | 704/232 |
| 2009/0112835 A1 * | 4/2009 | Elder | 707/4 |

* cited by examiner

*Primary Examiner* — Robert Beausoliel, Jr.
*Assistant Examiner* — Michael Pham
(74) *Attorney, Agent, or Firm* — Joseph Kolodka; Paul Schwarz

(57) ABSTRACT

A method and system for searching for information contained in a database of documents each includes an offline part and an online part. The offline part includes predicting, in a first computer process, semantic data for sentences of the documents contained in the database and storing this data in a database. The online part includes querying the database for information with a semantically-sensitive query, predicting, in a real time computer process, semantic data for the query, and determining, in a second computer process, a matching score against all the documents in the database, which incorporates the semantic data for the sentences and the query.

3 Claims, 2 Drawing Sheets

SEMANTIC SEARCH VIA ROLE LABELING

RELATED APPLICATION

This application claims the benefit of U.S. Provisional Application No. 61/026,844, filed Feb. 7, 2008, the entire disclosure of which is incorporated herein by reference.

FIELD OF THE INVENTION

This invention relates to query answering systems. More particularly, this invention relates to a query answering system that uses semantic searching methods.

BACKGROUND OF THE INVENTION

The marriage of Natural Language Processing (NLP) with Information Retrieval (IR) has long been desired by researchers. NLP techniques are intensely used in query answering (QA) systems, indeed QA has been a playground for Artificial Intelligence since the 1960s. NLP techniques such as ontologies, syntactic parsing and information extraction techniques can be commonly found in a good QA system.

Although QA has been successful in domain specific areas and in small document collection such as TREC, large scale open-domain QA is still very difficult because the current NLP techniques are too expensive for massive databases like the internet Therefore, some commercial systems resort to simplified NLP, where, for example an attempt is made to map user queries (questions) to previously hand-picked question/answer sets. Thus, the performance of such systems is limited to their QA database.

Recently, a fast convolutional neural network approach for semantic extraction called SENNA has been described, which achieves state-of-art performance for Propbank labeling, while running hundreds of times faster than competing methods.

SUMMARY

A method is disclosed herein for searching for information contained in a database of documents. The method comprises predicting, in a first computer process, semantic data for sentences of the documents contained in the database, querying the database for information with a semantically-sensitive query, predicting, in a real time computer process, semantic data for the query, and determining, in a second computer process, a matching score against all the documents in the database, which incorporates the semantic data for the sentences and the query.

Also disclosed herein is a system for searching for information contained in a database of documents. The system comprises a central processing unit and a memory communicating with the central processing unit. The memory comprises instructions executable by the processor for predicting, in a first computer process, semantic data for sentences of the documents contained in the database, querying the database for information with a semantically-sensitive query, predicting, in a real time computer process, semantic data for the query, and determining, in a second computer process, a matching score against all the documents in the database, which incorporates the semantic data for the sentences and the query.

DETAILED DESCRIPTION

Disclosed herein is a semantic searching method for use in a query answering (QA) system. The semantic searching method efficiently indexes and retrieves sentences based on a semantic role matching technique that uses a neural network architecture similar to SENNA. First, semantic roles (metadata) are computed offline on a large database of documents (e.g., general web data used by search engines or special collections, such as Wikipedia) and the metadata is stored along with word information necessary for indexing. At query time, semantic roles are predicted for the query online and a matching score against all the documents in the database, is computed that incorporates this semantic information.

The offline processing and online labeling are performed using fast prediction methods. Therefore, given the indices computed offline, the retrieval time of the present system is not much longer than other simple IR models such as a vector space model, while the indexing itself is affordable for daily crawling. More importantly, the neural network framework described herein is general enough to be adapted to other NLP features as well, such as named entity recognition and coreference resolution.

Figure 1:
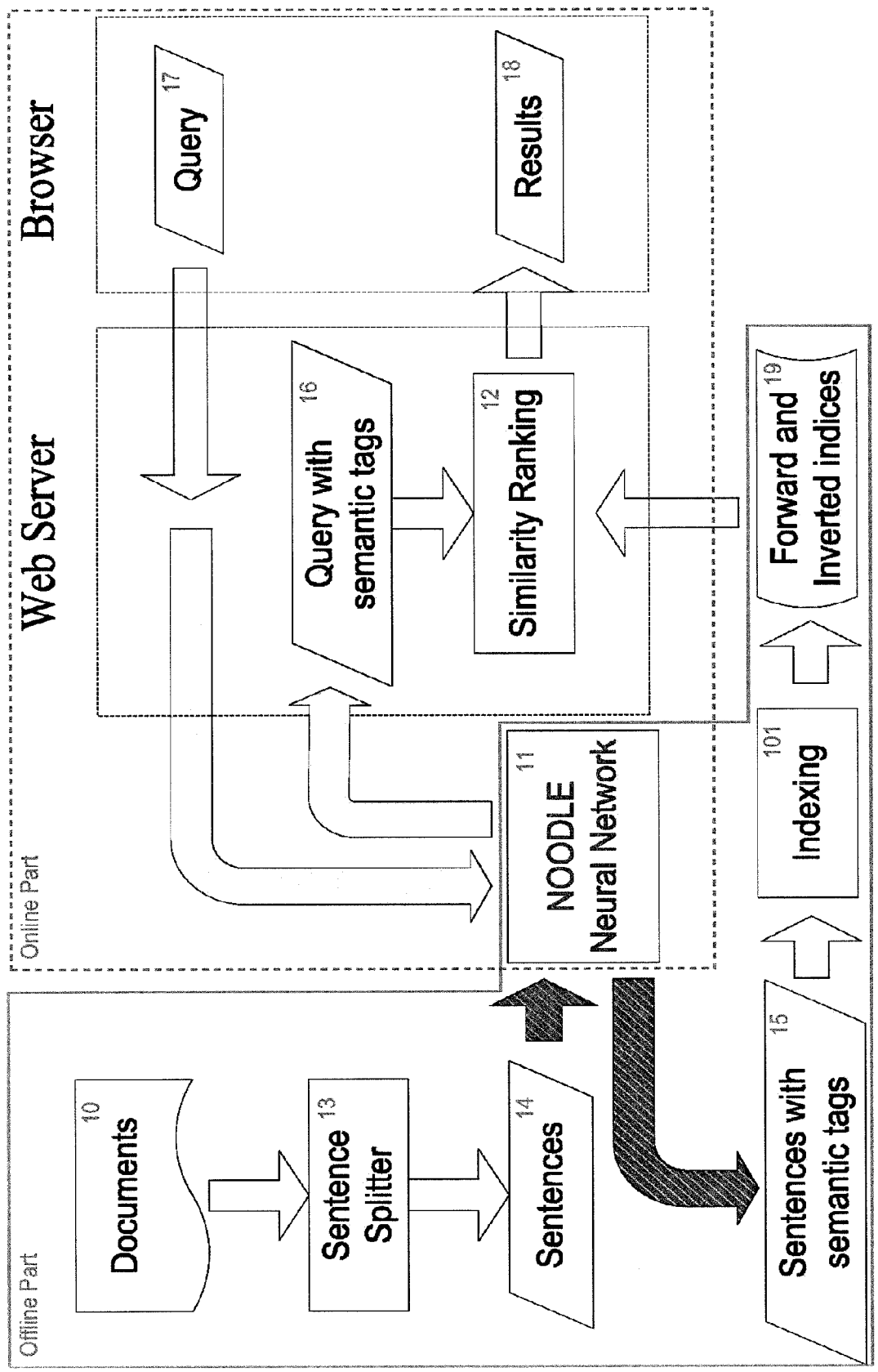
FIG. 1 is a flowchart illustrating an exemplary embodiment of the semantic searching method of the present disclosure.

FIG. 1 is a flowchart illustrating an exemplary embodiment of the semantic searching method of the present disclosure. The method generally comprises an offline process and an online process.

In the offline process, documents are collected in step 10 and processed in step 13 with a sentence splitter. The sentence splitter separates each document into discrete sentences. The sentences at the output 14 of the sentence splitter, are processed by a tagger in step 11. In the present disclosure, the tagger comprises a neural network. The neural network tagger computes part-of speech (POS) tags and semantic role tag predictions for each sentence. The sentences and their POS tags and role labeling information at the output 15 of the neural network tagger are indexed at step 101 and stored in a database in step 19 as a forward index and an inverted index.

In the online process, a user query 17 entered into browser 20 is sent by web server 30 to the neural network tagger for processing on the fly. The neural network tagger computes part-of speech (POS) tags and semantic role tag predictions for the query. In step 12, the web server calculates the similarity between the query and the sentences stored in the database containing the forward and inverted indices calculated during the offline process using the query's POS tags and role labeling information at the output 16 of the neural network tagger and each sentence's syntactic and/or role labeling information stored in the database as forward and inverted indices, and then ranks the similarity calculations. The result of the similarity ranking is displayed by the browser 20 for viewing by the user in step 18. The result comprises top ranked sentences which are most likely to match the semantic meaning of the query 17.

Figure 2:
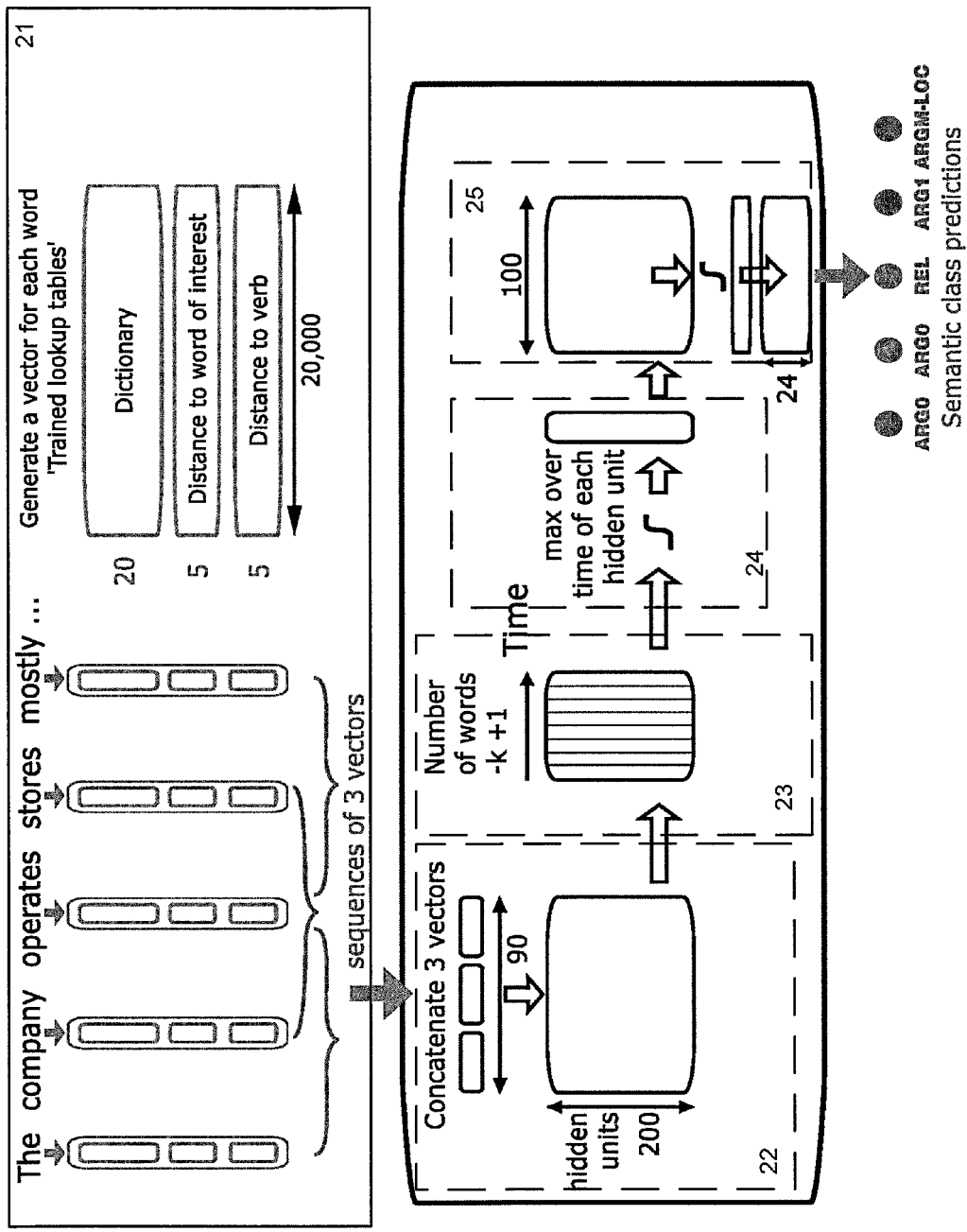
FIG. 2 is a flowchart illustrating an exemplary embodiment of a neural network tagger of the present disclosure.

FIG. 2 is a flowchart illustrating an exemplary embodiment of the neural network tagger. The neural network tagger comprises but is not limited to a five layer convolutional neural network. The neural network tagger provides a semantic role prediction for a single given word of interest. This procedure has to be repeated for each word in the sentence/query. For ease of description and not limitation, the neural network tagger will now be described using a word of interest w that corresponds to a verb v and the sentence/query, "The company operates stores mostly . . . ." For each word input to the network, two salient features are: (1) its distance from the word w being labeled; and (2) its distance from the verb v of interest. These two features, and the words themselves, are the only input to the neural network tagger. Because, the neural network tagger cannot handle text directly, in step 21, the first layer of the neural network tagger converts each word in the input sentence via a lookup table (dictionary) into a low dimensional (e.g., 20 dimensional) vector that comprises the features that represent that word. These features are learned during backpropagation. If the input sentence contains n words, the lookup table provides a 20×n feature representation. Two more types of features are also concatenated onto those features, the distance to the word w to label and the distance to the verb v. Both of these features are also encoded via lookup tables (e.g., each 5 dimensional). The neural network tagger will learn its own measure of distance useful for obtaining good classification accuracy.

In the second layer of the neural network tagger, represented by steps 22 and 23, the vectors for each word in the sentence/query are transformed by convolution to a matrix (step 22) which includes, for example, k+1 columns (vectors) and 200 rows (step 23). Using this example, the convolutional second layer is capable of outputting 200 features for every window of, for example, 3 adjoining words in the sentence/query. The convolutional second layer enables the neural network to deal with variable length sentences/queries. So for a sentence/query of length n the second layer of the neural network tagger outputs (n−2)×200 features.

In the third layer of the neural network tagger, the columns or vectors (each of which comprises 200 rows) of the resulting matrix from the second layer are converted into a single vector in step 24 by examining each row of the columns to find the largest (maximum) value, and constructing the single vector from the maximum value in each row of the columns. The max function is applied over that feature set with the intuition that the most pertinent locations in the sentence for various learned features are identified at this layer of the neural network tagger. Independent of sentence/query length, this exemplary embodiment of the neural network tagger outputs 200 features. The single vector is processed by the fourth and fifth layers of the neural network tagger in step 25 to get the role label of the word w. Specifically in this exemplary embodiment, 100 hidden units are applied to the single vector in the fourth layer of the neural network and the fifth layer of the neural network predicts possible outputs (classes). The fifth layer may be a linear layer that predicts 24 possible classes. The neural network tagger is trained by backpropagation to minimize training error.

In an exemplary embodiment, the similarity between the query and the sentences stored in the forward and inverted indices may be calculated by the web server during the offline process using the following method. First, the similarity between a query Q and a sentence S may be represented as Equations (1) and (2).

$$SENmatch(Q, S) = \sum_{a \in PAS(Q)} w(a) \max_{b \in PAS(S)} PASmatch(a, b), \quad (1)$$

$$w(a) = \frac{idf(v_a)}{\sum_{k \in PAS(Q)} idf(v_k)}$$

$$PASmatch(a, b) = \frac{V_{semtfidf}^T(a) \cdot V_{semtfidf}(b)}{\sqrt{V_{semtfidf}^T(a) V_{semtfidf}(a)} \sqrt{V_{semtfidf}^T(b) V_{semtfidf}(b)}} \cdot I(a, b), \quad (2)$$

$$I(a, b) = \begin{cases} 1, & v_a \text{ and } v_b \text{ are synonyms} \\ 0, & \text{otherwise} \end{cases}$$

A predicate-argument-structure (PAS) of a sentence, is the part of sentence which has a meaningful role for a certain verb. For example, the sentence, "the cat sat on the mat and ate fish" has two PASs, i.e., 1) "the cat sat on the mat"; 2) "the cat ate fish". For each PAS a in query Q, similarity is calculated with all PASs in sentence S, and consider the maximum as the similarity between a and S. The similarity SENmatch(Q,S) is a weighted sum of similarities between each query PAS and S. The weight is the relative importance of the verb in the query PAS, indicated by its inverse document frequency (IDF).

The similarity between PAS a and b (PASmatch(a,b)) is a variant of classical cosine measure, with two modifications. In the first modification, the vector $V_{semtfidf}(x)$ for a PAS x is a vector of size |W||R|, where |W| is the size of vocabulary, and |R| is the number of possible semantic roles. In other words, the vector has an entry for each combination of a word and a semantic role. If there is a word w (w is a unique integer id of a word, starting with 0) with a role r (r is a unique integer id for a semantic role, starting with 0) in the PAS x, then the entry with index (w|R|+r) is set to the IDF of word w; otherwise the entry is set to 0. In the second modification, the similarity between two PASs is considered only if their verbs are synonyms, as indicated by the term I(a,b) in Eq. (2)

One skilled in the art will recognize that both the web server and the computer system that performs the offline process, as described herein, may each comprise any suitable computer system. The computer system may include, without limitation, a mainframe computer system, a workstation, a personal computer system, a personal digital assistant (PDA), or other device or apparatus having at least one processor that executes instructions from a memory medium.

The computer system may include one or more memory mediums on which one or more computer programs or software components may be stored. The one or more software programs which are executable to perform the methods described herein, may be stored in the memory medium. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. In addition, the memory medium may be entirely or partially located in one or more associated computers or computer systems which connect to the computer system over a network, such as the Internet.

The methods described herein may also be executed in hardware, a combination of software and hardware, or in other suitable executable implementations. The methods implemented in software may be executed by the processor of the computer system or the processor or processors of the one or more associated computers or computer systems connected to the computer system.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A method for searching for information contained in a database of documents, the method comprising the steps of:
   in a computer process, predicting parts-of-speech and semantic tags for sentences of the documents in the database;
   in a computer process, storing the sentences and the tags in an inverted index;
   requesting information from the database with a query;
   in a computer process, predicting parts-of-speech and semantic tags for the query;
   in a computer process, determining a score indicative of the similarity between each of the sentences and the query using the tags corresponding to the sentences stored in the index and the tags corresponding to the query, wherein the similarity between each of the sentences and the query comprises:

$$SENmatch(Q, S) = \sum_{a \in PAS} w(a) \max_{b \in PAS(S)} PASmatch(a, b), w(a) = \frac{idf(v_a)}{\sum_{k \in PAS(Q)} idf(v_k)} \text{ and } PASmatch(a, b) =$$

$$\frac{V_{semtfidf}^T(a) \cdot V_{semtfidf}(b)}{\sqrt{V_{semtfidf}^T(a) V_{semtfigf}(a)} \sqrt{V_{semtfidf}^T(b) V_{semtfidf}(b)}}.$$

$$I(a, b), I(a, b) = \begin{cases} 1, & V_a \text{ and } V_b \text{ are synonyms} \\ 0, & \text{otherwise,} \end{cases}$$

and wherein Q is the query, S is the sentence, SENmatch(Q, S) is the similarity between the query and the sentence, PAS is a predicate-argument structure of the sentence, idf is inverse document frequency of verb v, PASmatch(a, b) is the similarity between PAS a and PAS b, and $V_{semtfidf}$ is a vector of PAS;
   in a computer process, ranking the sentences according to their corresponding scores, wherein the sentences with the highest rankings match the semantic meaning of the query.

2. The method of claim 1, wherein the steps of predicting the parts-of-speech and semantic tags for the sentences and storing the sentences and the tags in the inverted index, are performed offline.

3. The method of claim 1, wherein the steps of predicting the parts-of-speech and semantic tags for the query, determining the similarity scores, and ranking the sentences, are performed online.

* * * * *